April 28, 1931.  H. FORD  1,803,059
SPEEDOMETER DRIVE MOUNTING
Filed June 13, 1927
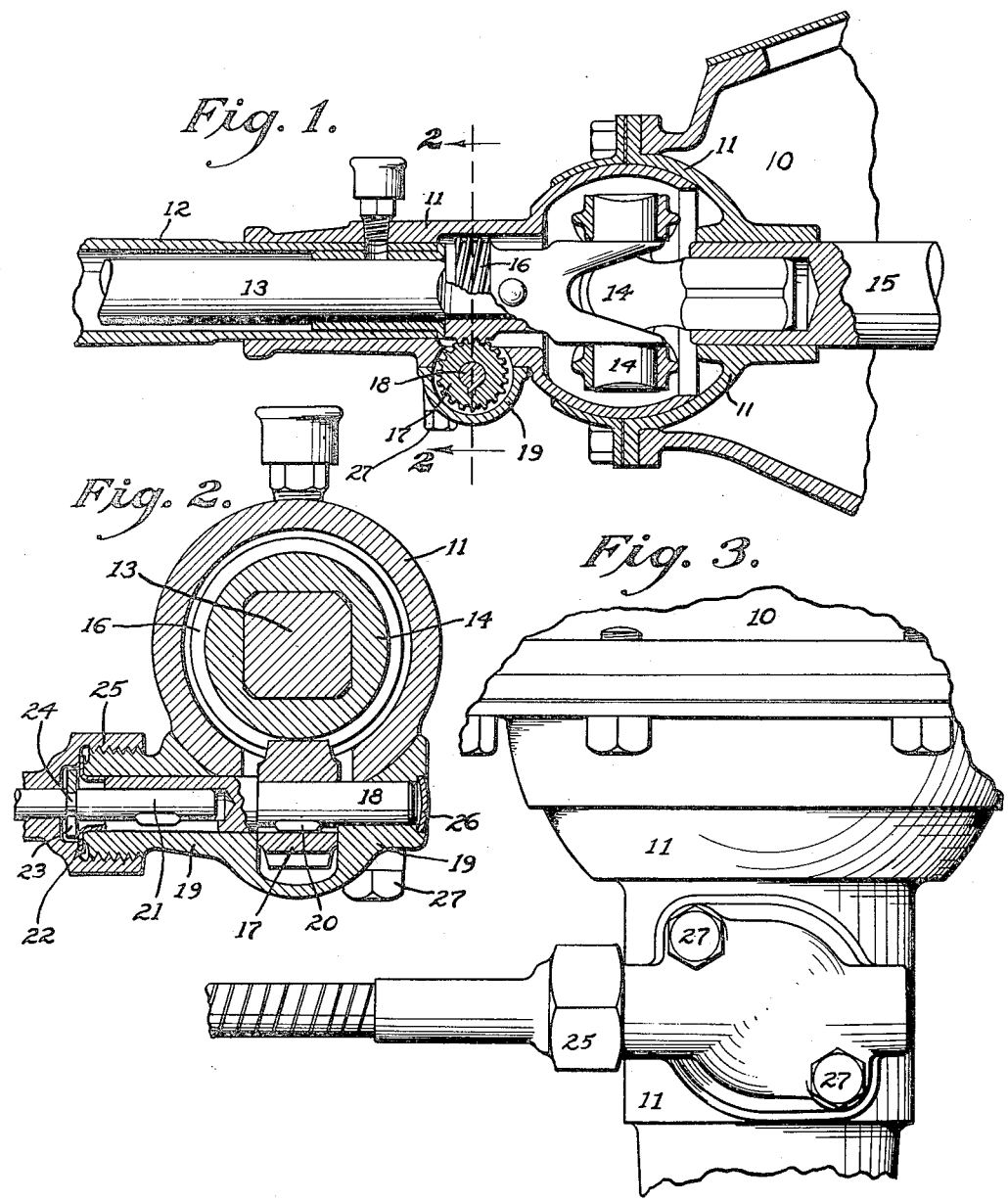
INVENTOR.
Henry Ford.
BY
ATTORNEY.

Patented Apr. 28, 1931

1,803,059

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

SPEEDOMETER-DRIVE MOUNTING

Application filed June 13, 1927. Serial No. 198,514.

The object of my invention is to provide a speedometer drive mounting of simple, durable and inexpensive construction.

A further object of my invention is to provide a mounting for the speedometer gears whereby one of the gears may be readily removed and replaced with a similar or dissimilar gear whereby repairs may be facilitated and the speedometer drive gear ratio may be changed to correspond with varying tire sizes or rear axle gear ratios without making it necessary to disassemble any major parts of the mounting.

With these and other objects in view my invention consists in the arrangement, combination and construction of the various parts of my improved device as described in the specifications, claimed in the claims, and illustrated in the accompanying drawings in which:

Figure 1 shows a longitudinal, vertical, sectional view through the universal joint and drive shaft construction of a motor vehicle illustrating the mounting of my improved speedometer drive.

Figure 2 shows a transverse, enlarged, sectional view taken on the line 2—2 of Figure 1 and Figure 3 shows a bottom view of the parts shown in Figures 1 and 2.

Referring to the accompanying drawings, I have used the reference numeral 10 to indicate generally the rear end of a transmission housing which terminates in a universal joint housing 11. A drive shaft housing 12 is disposed rearwardly of the universal joint housing. The drive shaft 13 is provided at its forward end with a universal joint 14 which in turn is connected to the transmission shaft 15. These parts are all of standard construction and merely used as illustrative of the manner of using my improved speedometer drive.

The forward end of the drive shaft 13 or the rear member of the universal joint 14 is provided with worm teeth 16 which may be formed integral therewith or otherwise secured to the parts mentioned. The bottom of the universal joint housing 11 is provided opposite worm teeth 16 with a slot whereby a worm wheel 17 may be extended in through the housing to contact with the worm teeth 16. This worm wheel 17 is mounted on a shaft 18 which is journalled in a combined cap and housing member 19. The shaft 18 is preferably formed with an integral key 20 to coact with a corresponding keyway in the wheel 17. The outer end of the shaft 18 is enlarged, and a bore and slot is formed therein to receive a correspondingly keyed connection 21 for a flexible speedometer drive shaft, so the shaft 18 may rotate the speedometer shaft. The recess in the cap 19 which receives the wheel 17 is cut just wide enough so that the wheel will be held from longitudinal movement on the shaft 18. The shoulder at the end of the enlarged portion of the shaft 18 bears against the wheel 17 to hold said shaft from movement in one direction through cap 19. A cup shaped washer 22 is pressed into the bore in cap 19 to hold the shaft 18 from movement in the other direction. This washer has a flange thereon which bears against the end of the cap 19. A split resilient ring 23 is snapped into an annular groove 24 in the connection 21 so that it may lay between the washer 22 and the cable nut 25 to locate the connection 21 from longitudinal movement.

The cap 19 has a relatively large bore extending to the wheel receiving recess and a concentric smaller bore beyond the recess, so that both ends of the shaft 18 may be journalled in the cap 19. The end of the smaller bore is closed by a dished disk 26 such as is known in the trade as a "Welch plug."

Extensions are provided on the cap 19 to receive fastening screws 27 which are secured in corresponding holes in the universal joint 11 to thereby lock the cap 19 in place.

From the foregoing description it will be seen that the worm wheel 17 is entirely supported from and journalled in the cap 19 so that the speedometer drive may be disconnected by removing screws 27 and consequently the cap 19. The parts may then be repaired or replaced by merely replacing screws 27.

In connection with the manufacture of many automobiles it is customary to assemble the frames and engines and then to mount the body and wheels on the frame. Most automobiles have several types of wheels, tires, and gear ratios, as optional equipment to take care of different customer preferences and weights of bodies so that it is very often necessary to change the type of wheel or tire or axle gear ratio used on a particular chassis at some time between the time of its assembly and the time it reaches the hands of the final purchaser. Changing the tires, wheels, or axle gear ratio, however, make it necessary to change the speedometer drive ratio which has involved a lot of trouble in the past, as it was impossible to change this gear ratio without tearing down major portions of the chassis. With my improved construction however, the gear ratio may be changed by merely substituting another cap 19, with a corresponding worm wheel 17, which can be accomplished by loosening the nut 25 and removing screws 27. Replacement is of course merely the reverse of this operation.

Some changes may be made in the arrangement, construction and combination of the various parts of my improved device without departing from the spirit of my invention, and it is my intention to cover by my claims such changes as may reasonably be included within the scope thereof.

I claim as my invention:

In a device of the character described, a housing having a slot in the bottom thereof a shaft in said housing, a combined cap and housing member removably attached to the first described housing over said slot, said cap member having a bore therethrough which is relatively large at one end and small at the other, a shaft having corresponding diameters journalled in said bore, said shaft having a bore in its enlarged end, a speedometer flexible drive shaft connection received in said bore, a cup shaped washer mounted in the larger end of bore, a ring on said connection, and a nut adapted to co-act with said washer and ring and cap to lock the connection and first described shaft in the cap whereby said cap and connections and wheel may be removed or replaced as a unit on the first described housing.

HENRY FORD.